Oct. 7, 1958   O. KREIBAUM   2,854,696
METHOD FOR THE PRODUCTION OF MOLDED ARTICLES
Filed Nov. 22, 1950   3 Sheets—Sheet 1

Inventor
Otto Kreibaum
by Emery, Holcomb & Blair
Attorney

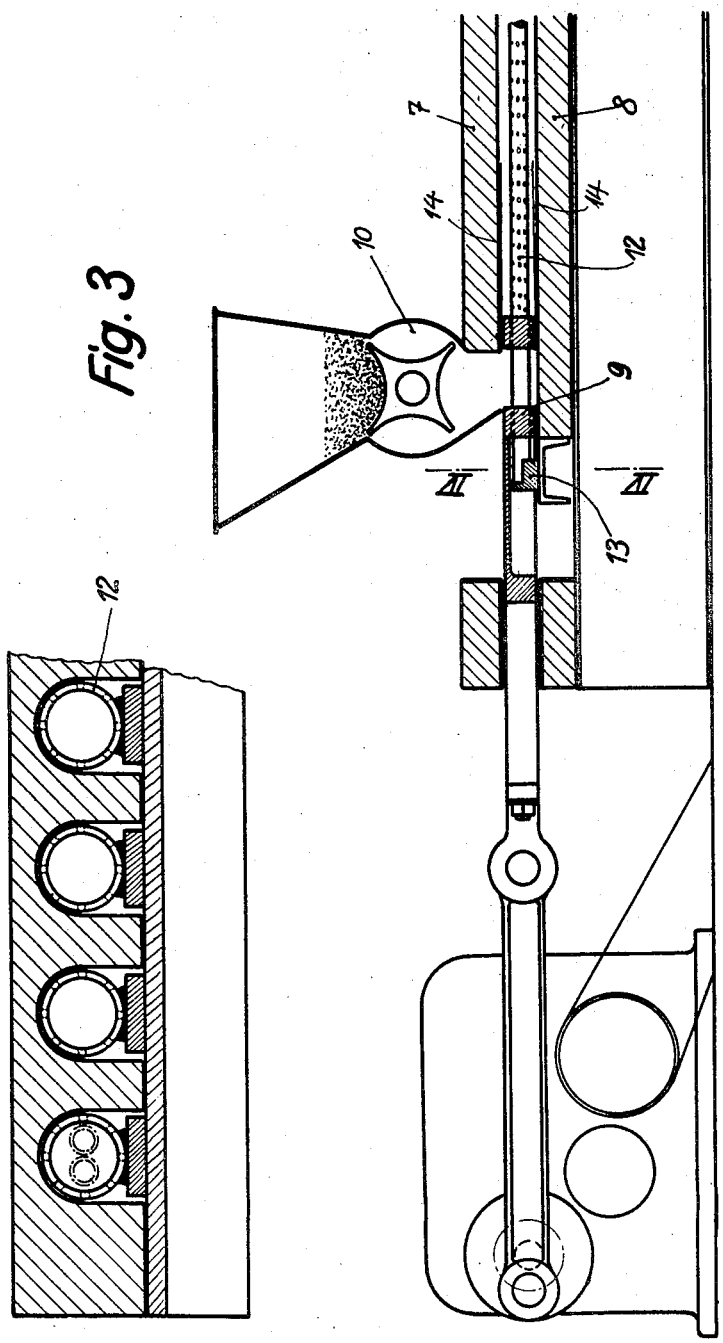

Oct. 7, 1958 O. KREIBAUM 2,854,696
METHOD FOR THE PRODUCTION OF MOLDED ARTICLES
Filed Nov. 22, 1950 3 Sheets-Sheet 3
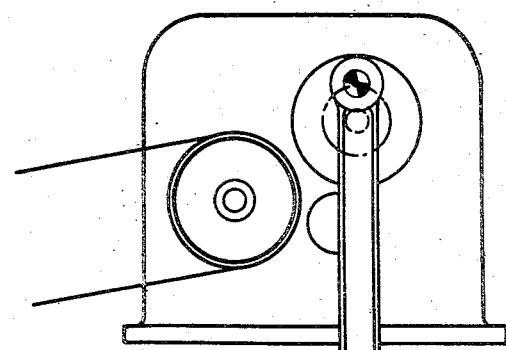
Fig.5
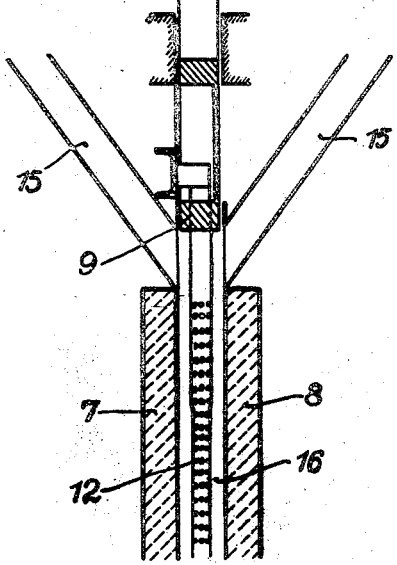
Inventor
Otto Kreibaum
by
Emery, Holcombe & Blair
Attorney

2,854,696

METHOD FOR THE PRODUCTION OF MOLDED ARTICLES

Otto Kreibaum, Lauenstein, Hannover, Germany

Application November 22, 1950, Serial No. 197,093

Claims priority, application Germany November 30, 1949

1 Claim. (Cl. 18—47.5)

This invention relates to a method of producing moulded materials and articles.

The invention is very suitable for the manufacture of panels, sheets, boards and the like from chips, shavings, shreds and the like (hereafter referred to as "chips") of short-fibred materials such as wood and other suitable fibrous organic materials, to which small proportions of a synthetic resin of the kind which hardens under heat and pressure are added. Sheets, panels and the like as hitherto made from such chips are satisfactory as regards strength, but they are not sufficiently stable, i. e. they warp easily as a result of variations in moisture content and in air temperature.

The main object of the invention is a method for producing panels and the like from chips, such as above referred to, which do not have the disadvantage described, but which, on the contrary, combine strength with a satisfactory stability against warping.

This object is achieved according to the invention by compressing the chips in successive layers, the thickness of which, in the pressing direction, is so designed that the chips are predominantly disposed in a plane transverse to the direction in which the pressure is applied. To this end the stroke of the piston in the press used can be made suitably short, so that the chips fed intermittently into the charging chamber of the press, insofar as they are disposed in or approximately in the direction in which the pressure is applied, are turned over by the said piston when they encounter a resistance, for example, the board already pressed in the press. The arrangement is such that a shorter piston stroke may be employed, in relation to the length of the chips, more completely to turn the chips over, so that they lie in a plane transverse to the direction in which the pressure is applied; i. e., a shorter piston stroke than would be required where the thickness of said layer is greater than that preferred in accordance with this invention. In order to increase the output of the press the rate of reciprocation of the piston can be increased in order to compensate for the shorter piston stroke. It is not necessary, when carrying out the invention, to provide for separate treatment of the longer and shorter chips.

Since, with varying moisture content, wood and similar fibres expand and contract only transversely to the direction of their fibres, and since in a sheet panel or the like made according to the invention the fibres extend predominantly in a plane perpendicular to the main plane of the sheet, warping of a sheet or the like made according to the invention does not take place. The sheet has accordingly properties similar to those of a panel used by joiners, the central portion of which is formed by short rods in which the fibres are upright; the invention providing in place of the short rods, adjacently disposed rows of strips of compressed chips of wood or the like. According to a further advantage of the invention the greater number of the chips are connected not at their sides but at their ends to the cover sheets of veneer, so that forces tending to break this connection only produce tensions in the chips which are readily taken up by the chips themselves.

A press for carrying out the new method according to the invention may be formed in the initial part of the compression chamber with a restricted passage so that the material compressed therein meets with a reduced resistance to its further movement. By suitably designing this restriction in the direction in which the pressure is applied, for example, by suitably designing the length of metal inlays, the degree of compression and hence the resulting strength of the sheet, panel or the like can be correspondingly adjusted.

If it is desired to provide longitudinal passages in a panel or the like made according to the invention the cores for forming the passages may be in the form of heating tubes. These tubes can thus provide in the interior of the panel for rapid heating of the synthetic resin binding agent.

The heating tubes can be made so that they act to reduce the resistance offered to the compressed material during its passage through the compression chamber. This can be effected by reducing the diameter of the heating cores along part of their length. Metal inlays or the like such as above referred to can then be dispensed with.

In the case that the panels, sheets or the like are to be made from short fibred wood splinters, which may be mixed to some extent with wood meal, it is inevitable that the finer material, whether in the form of smaller chips or meal, should flow between the coarser pieces to the bottom and there form a continuous layer, since the mixture employed is in dry form. In such a case, moreover, if it is compressed in a press having a horizontally disposed compression chamber, the finer material then forms a continuous longitudinal layer in the panel or sheet, which, because it has little strength, can easily render the whole panel useless. To avoid this, it is necessary first to screen the chips. Since this problem does not arise with a vertical press, the latter avoids the necessity of preliminary screening.

The applicant has found that this finer material is practically harmless providing it is not allowed to form a continuous longitudinal layer extending over the whole length of the panel. The invention thus permits of treating the material in the form in which it is produced, and does not require a preliminary sifting out of the fine material.

It will be understood that reference to the chips as being dry does not mean that they are completely devoid of moisture, but that they are in the condition commonly known in the art as dry. Such condition may range from that obtained from artificial drying methods to that resulting merely from exposure to the atmosphere at normal room temperatures. It will also be appreciated that reference to the mixture employed as being dry is for want of a better term and does not mean that it is entirely devoid of moisture. Actually some water may be employed in mixing the binding agent and the chips, as well as a suitable extender, if desired, so long as the resulting mixture is not plastic nor liquid, but is substantially dry.

In the accompanying drawings, which illustrate how the invention may be carried into effect, Figs. 1 and 2 are respectively perspective views illustrating two constructional examples of a sheet or panel made in accordance with the invention.

Fig. 3 illustrates diagrammatically a construction of a horizontal press used for making the sheets or panels shown in Figs. 1 and 2;

Fig. 4 is a cross section of a detail view taken on line IV—IV, Fig. 3; and

Fig. 5 illustrates diagrammatically a construction of a vertical press used for making the sheets or panels shown in Figs. 1 and 2.

Figure 1:
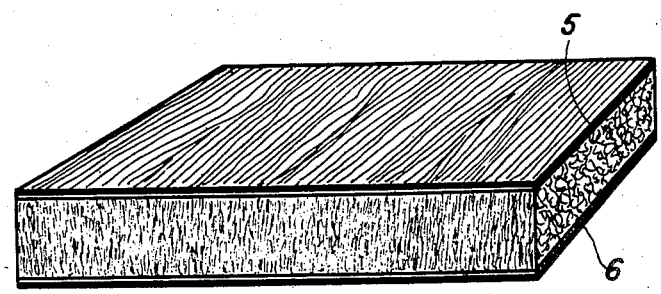
Fig. 1 shows a panel consisting of two outer sheets 5, 6 made of a suitable veneer and a central core or layer of compressed splintery wood mixed with a binding agent incorporating a synthetic resin, the fibres of the wood being arranged, in general, in a plane transverse to the main plane of the sheet.
Figure 2:
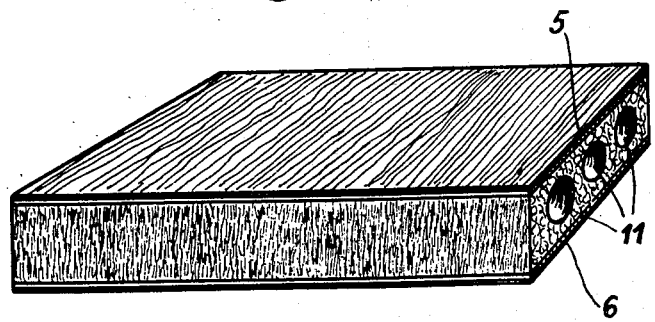

The sheet or panel shown in Fig. 2, is, in general, similar to that of Fig. 1 but differs therefrom in that passages 11 of circular cross section are formed in the central core or layer of splintery wood. The passages can also be in the form of grooves, i. e. they can be open along one side of the sheet. In this way it is possible, inter alia, to make sheets having longitudinally extending hollow spaces by placing together two sheets each having a thickness of one-half that of the finished sheet, and each formed with grooves on the sides which are to be placed together.

The press shown in Figs. 3 and 4 comprises a compression chamber, the top and bottom sides of which are formed by heating plates 7, 8. The pressure exerting piston 9 acts upon a mixture supplied from the charging apparatus 10 in measured quantities consisting of a short fibred organic material such as wood, mixed preferably with 5 to 8% of a binding agent incorporating a synthetic resin, and conveys it into the compression chamber between the plates 7 and 8. This percentage of binding agent employed may vary from one to twelve percent by weight of the mixture. During this movement, the chips which are disposed in the plane in which the pressure is applied are turned as soon as they meet an obstacle, i. e., the board already pressed in the press, so that they take up the desired position which is transverse to the plane in which the pressure is exerted. The initial part of the compression chamber is narrowed somewhat by sheet metal inlays or the like 14, so that the material compressed therein meets with less resistance during its further movement in the compression chamber. As shown in Fig. 5, desired resistance against movement of the formed product through the press is attainable by the friction between the product and the parallel plates 7 and 8 without employing the sheet metal inlays 14 illustrated in Fig. 3.

The tubes 12, provided with transverse apertures are used for the purpose of moulding the passages 11 shown in Fig. 2. These tubes are fixedly held against movement by the bearings 13 (Fig. 3), the piston 9 sliding over them. Moisture issuing from the board during heating can flow away to atmosphere through the tubes 12. The tubes 12 can however also be used as heating tubes, for example, by passing steam through them. This may be accomplished, as shown in the left portion of Fig. 4 in broken lines, by providing smaller pipes for the steam or other heating medium extending longitudinally into, through and back out of each of the tubes 12, so that the heating medium cannot escape into and through the tubes 12 and into the board being formed. Also, the tubes 12 may have imperforate walls.

The panels obtained by providing the passages 11 are of relatively small weight which is of particular advantage, in the case of panels for room doors and like thick-walled panels.

The press shown in Fig. 5 is provided with a vertically disposed compression chamber 16, confined by the heating plates 7, 8, and with the tubes 12 and inclined charging passages 15. In the compression chamber 16 the wood or like chips mixed with a binding agent incorporating a synthetic resin are compressed in successive layers into a continuous panel or sheet of unlimited length. Fine material flowing downwards produces thin upright layers in the finished sheet. These layers of fine material may correspond to the quantity of wood meal which is fed into the compression chamber during each individual piston stroke, but it will be understood that I do not mean to limit the term fine material, as herein employed, to wood meal, since no meal at all may be included in the mixture used. Under all circumstances, however, the mixture will comprise chips of various sizes, the smaller ones of which are accurately defined as fine material and the larger ones as coarser material. The said layers are separated from each other by a substantially thicker layer of coarser material.

The temperature required, as determined by the heating plates 7, 8, or such plates and the tubes 12, may be only sufficient to initiate setting if a catalyst is employed; since even during subsequent cooling of the formed panel, as after it passes from the press, the catalyst will insure completion of the glue setting action, as is well-known in the art.

The charging device shown is only to be regarded as one example of construction.

The bucket wheel illustrated in Fig. 3 is designed to feed uniform quantities of the chips to the press. It is however possible to use a form of charging device which does not include a bucket wheel, and adapted, for example, to feed the material directly into the compression chamber, in particular when the panel or sheet is to be made without passages such as 11. The invention is adapted not only for making cores for plywood but also for numerous other applications, for example, constructional panels, floor panels, panels for outbuildings, e. g. stables, stalls, styes, and the like; and also for other shaped articles. A particular advantage of the method according to the invention is that it can be used in small factories having only a small supply of wood or like chips, shavings, and like waste material, since it does not require the expensive moulds and presses hitherto required for the manufacture of panels, sheets and like articles from chips and the like, of wood or other fibrous organic materials, which can be used instead of wood.

What I claim is:

The method of continuously making a board of indefinite length from chips of splintery wood wherein the chips are predominantly disposed with their lengths substantially transversely of the board, which comprises mixing such chips with a thermo-setting binding agent, serially feeding by gravity alone measured quantities of such mixture down opposed inclined paths into a vertically disposed compression chamber and letting the same fall upon a previously pressed portion of the board, then applying compressive force to the mixture in said chamber after such feeding of each said measured quantity sufficient to compress the same in and advance it downwardly along and through the compression chamber, and heating said compression chamber sufficiently to cause setting of the binding agent.

References Cited in the file of this patent

UNITED STATES PATENTS

| | | |
|---|---|---|
| 235,886 | Lindsley | Dec. 28, 1880 |
| 796,545 | Watson | Aug. 8, 1905 |
| 1,183,760 | Parker | May 16, 1916 |
| 1,802,852 | Vincke | Apr. 28, 1931 |
| 1,900,830 | Mahlstedt et al. | Mar. 7, 1933 |
| 1,920,716 | Schafer | Aug. 1, 1933 |
| 1,971,064 | Corlette et al. | Aug. 21, 1934 |
| 2,001,970 | Mazer | May 21, 1935 |
| 2,012,805 | Brown et al. | Aug. 27, 1935 |
| 2,061,918 | Nanfeldt | Nov. 24, 1936 |
| 2,260,081 | Lefebure et al. | Oct. 21, 1941 |
| 2,280,022 | Banigan et al. | Apr. 14, 1942 |

(Other references on following page)

UNITED STATES PATENTS

| | | |
|---|---|---|
| 2,288,072 | Collins | June 30, 1942 |
| 2,301,951 | Isman | Nov. 17, 1942 |
| 2,378,642 | Kopplin | June 19, 1945 |
| 2,446,644 | Fischer | Aug. 10, 1948 |
| 2,446,782 | Otis et al. | Aug. 10, 1948 |
| 2,524,683 | Sumpf | Oct. 3, 1950 |
| 2,527,628 | Francis | Oct. 31, 1950 |
| 2,587,930 | Uschmann | Mar. 4, 1952 |
| 2,592,470 | Ryberg | Apr. 8, 1952 |
| 2,609,312 | Farrell | Sept. 2, 1952 |
| 2,648,262 | Croston et al. | Aug. 11, 1953 |
| 2,657,430 | Upton | Nov. 3, 1953 |

FOREIGN PATENTS

| | | |
|---|---|---|
| 608,252 | Great Britain | Sept. 13, 1948 |
| 613,362 | Great Britain | Nov. 25, 1948 |